(12) United States Patent
Zhu et al.

(10) Patent No.: US 10,361,804 B2
(45) Date of Patent: Jul. 23, 2019

(54) USER EQUIPMENT AND METHOD FOR DYNAMIC NON-ORTHOGONAL MULTIPLE ACCESS COMMUNICATION

(71) Applicant: Intel IP Corporation, Santa Clara, CA (US)

(72) Inventors: Yuan Zhu, Beijing (CN); Fangze Tu, Beijing (CN); Qinghua Li, San Ramon, CA (US); Xiaogang Chen, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/646,789

(22) Filed: Jul. 11, 2017

(65) Prior Publication Data

US 2018/0069644 A1 Mar. 8, 2018

Related U.S. Application Data

(63) Continuation of application No. 14/578,016, filed on Dec. 19, 2014, now Pat. No. 9,712,272.

(Continued)

(51) Int. Cl.
*H04J 11/00* (2006.01)
*H04W 52/04* (2009.01)
(Continued)

(52) U.S. Cl.
CPC .......... *H04J 11/003* (2013.01); *H04L 5/0037* (2013.01); *H04L 5/0053* (2013.01);
(Continued)

(58) Field of Classification Search
CPC ... H04L 5/0007; H04L 5/0053; H04W 72/042
See application file for complete search history.

(56) References Cited

U.S. PATENT DOCUMENTS 8,665,809 B2   3/2014  Malladi et al.
8,849,339 B2 * 9/2014  Anto ................... H04W 52/226
                                                 455/522
(Continued)

FOREIGN PATENT DOCUMENTS

EP         2858281 A1   4/2015
JP      2008526139 A    7/2008
(Continued)

OTHER PUBLICATIONS

"European Application Serial No. 15803225.0, Response filed Jun. 14, 2018 to Extended European Search Report dated Nov. 20, 2017", 16 pgs.

(Continued)

*Primary Examiner* — Chandrahas B Patel
(74) *Attorney, Agent, or Firm* — Schwegman Lundberg & Woessner, P.A.

(57) ABSTRACT

Embodiments pertain to systems, methods, and component devices for dynamic non-orthogonal multiple access (NOMA) communications. A first example embodiment includes user equipment (UE) configured to receive a first downlink control indicator (DCI) from an evolved node B (eNB) and process the first subframe as a first higher power NOMA subframe in response to a first power ratio signal. The DCI includes the first power ratio signal for a first NOMA subframe. The UE may then receive, from the eNB, a second DCI, the second DCI comprising a second power ratio signal for a second subframe and process, by the UE, the second subframe as a second lower power NOMA subframe in response to the second power ratio signal. Additional embodiments may further use another DCI with a third power ratio signal to configure the UE to receive orthogonal multiple access (OMA) communications.

17 Claims, 6 Drawing Sheets

Related U.S. Application Data (60) Provisional application No. 62/006,731, filed on Jun. 2, 2014.

(51) Int. Cl.
  *H04W 52/34* (2009.01)
  *H04L 5/00* (2006.01)

(52) U.S. Cl.
  CPC ......... *H04W 52/04* (2013.01); *H04W 52/346* (2013.01); *H04L 5/0044* (2013.01)

(56) References Cited

U.S. PATENT DOCUMENTS

| | | |
|---|---|---|
| 9,420,576 B2 | 8/2016 | Chen et al. |
| 9,712,272 B2 | 7/2017 | Zhu et al. |
| 2013/0286956 A1 | 10/2013 | Lee |
| 2014/0029562 A1 | 1/2014 | Kishiyama |
| 2014/0050279 A1 | 2/2014 | Kishiyama |
| 2014/0086160 A1 | 3/2014 | Kim et al. |
| 2015/0351081 A1 | 12/2015 | Zhu et al. |
| 2016/0006529 A1 | 1/2016 | Yi et al. |
| 2016/0014785 A1 | 1/2016 | Benjebbour et al. |

FOREIGN PATENT DOCUMENTS

| | | |
|---|---|---|
| JP | 2013009288 A | 1/2013 |
| JP | 2013009290 | 1/2013 |
| JP | 2013009291 A | 1/2013 |
| JP | 2013247513 | 12/2013 |
| WO | WO-2009131162 A1 | 10/2009 |
| WO | WO-2013115037 A1 | 8/2013 |
| WO | WO-2013122433 A1 | 8/2013 |
| WO | WO-2013176042 A1 | 11/2013 |
| WO | WO-2015167714 A1 | 11/2015 |
| WO | WO-2015187298 A1 | 12/2015 |

OTHER PUBLICATIONS

"Korean Application Serial No. 2016-7030592, Notice of Preliminary Rejection dated May 16, 2018", W/English Translation, 8 pgs.
"Korean Application Serial No. 2016-7030592, Voluntary Amendment filed on Jan. 15, 2018", W/ English Claims, 19 pgs.
"U.S. Appl. No. 14/578,016, Non Final Office Action dated Nov. 9, 2016", 14 pgs.
"U.S. Appl. No. 14/578,016, Notice of Allowance dated Mar. 16, 2017", 7 pgs.
"U.S. Appl. No. 14/578,016, Response filed Feb. 9, 2017 to Non Final Office Action dated Nov. 9, 2016", 11 pgs.
"Discussion on physical layer aspects for support of dual connectivity", Intel Corporation, (May 10, 2014), 1-3.
"European Application Serial No. 15803225.0, Extended European Search Report dated Nov. 20, 2017", 12 pgs.
"International Application Serial No. PCT/US2015/029595, International Preliminary Report on Patentability dated Dec. 15, 2016", 8 pgs.
"International Application Serial No. PCT/US2015/029595, International Search Report dated Aug. 11, 2015", 3 pgs.
"International Application Serial No. PCT/US2015/029595, Written Opinion dated Aug. 11, 2015", 6 pgs.
"Japanese Application Serial No. 2016-570867, Office Action dated Jan. 9, 2018", w/English Translation, 6 pgs.
"Power-control mechanisms for dual connectivity", NTT DOCOMO, (May 10, 2014), 1-5.
Benjebbovu, Anass, et al., "System-level performance of downlink NOMA for future LTE enhancement", 2013 IEEE Globecom Workshops (GC Wkshps), IEEE (Dec. 9, 2013), 66-70.
"Brazilian Application Serial No. BR 11 2016 025638-7, Voluntary Amendment filed on Jan. 23, 2018", W/ English Claims, 17 pgs.
"Indian Application Serial No. 201647036561, Voluntary Amendment filed Feb. 13, 2018", (W/ English Claims), 13 pgs.
"Japanese Application Serial No. 2016-570867, Response filed Apr. 5, 2018 to Office Action dated Jan. 9, 2018", (W/ English Claims), 28 pgs.
"Japanese Application Serial No. 2016-570867, Examiners Decision of Final Refusal dated Sep. 25, 2018", W/ English Translation, 4 pgs.
"Korean Application Serial No. 2016-7030592, Notice of Preliminary Rejection dated Dec. 28, 2018", w/ English translation, 5 pgs.
"Korean Application Serial No. 2016-7030592, Response filed Aug. 16, 2018 to Notice of Preliminary Rejection dated May 16, 2018", W/ English Claims, 19 pgs.
"Korean Application Serial No. 2016-7030592, Response filed Feb. 27, 2019 to Notice of Preliminary Rejection dated Dec. 28, 2018", w English Claims, 13 pgs.
"Japanese Application Serial No. 2018-072956, Notification of Reasons for Rejection dated Mar. 5, 2019", W English Translation, 6 pgs.

\* cited by examiner

USER EQUIPMENT AND METHOD FOR DYNAMIC NON-ORTHOGONAL MULTIPLE ACCESS COMMUNICATION

PRIORITY CLAIM

This application is a continuation of U.S. patent application Ser. No. 14/578,016, filed Dec. 19, 2014, which claims the benefit of priority under 35 U.S.C. 119(e) to U.S. Provisional Patent Application Ser. No. 62/006,731, filed on Jun. 2, 2014, each of which is incorporated herein by reference in its entirety.

TECHNICAL FIELD

Some embodiments pertain to systems, methods, and component devices associated with a non-orthogonal multiple access (NOMA) communications. Some embodiments pertain to a use of downlink control indicators (DCI) for dynamic switching between different types of communications including NOMA communications. Some embodiments pertain to communications in accordance with one or the 3GPP LTE standards, including communications in accordance with LTE Advanced (LTE-A) releases 13 and 14. Some embodiments pertain to $5^{th}$ Generation wireless communication systems.

BACKGROUND

Wireless mobile communication technology uses various standards and protocols to transmit data between a base transceiver station or evolved universal mobile telecommunications system terrestrial radio access node B (eNB) and a wireless mobile device or user equipment (UE). Conventional third generation and fourth generation wireless systems use orthogonal multiple access (OMA) where symbols do not interfere with each other in multiple access techniques. Examples of OMA include code division multiple access (CDMA) and orthogonal frequency division multiple access (OFDMA.) Users in such CDMA and OFDMA systems use a portion of the available radio resource orthogonally. By contrast, non-orthogonal multiple access (NOMA) involves multiple devices sharing the same radio resource in such a way that the symbols of different users do interfere with each other. In NOMA systems, symbols to different users may essentially be transmitted on top of one another. User separation of the symbols mainly relies on smart power allocation at the transmitter side and advance processing at the receiver side to separate the interfering symbols. This enables multiple devices to share the same bandwidth.

DETAILED DESCRIPTION

Embodiments describe systems, methods, and component devices for a non-orthogonal multiple access (NOMA) communications. In particular, certain embodiments use advanced signaling to enable an evolved universal mobile telecommunications system terrestrial radio access node B (eNB) to select different transmission types to a single UE, with the transmission types including NOMA transmissions and orthogonal multiple access (OMA) transmissions.

Figure 1:
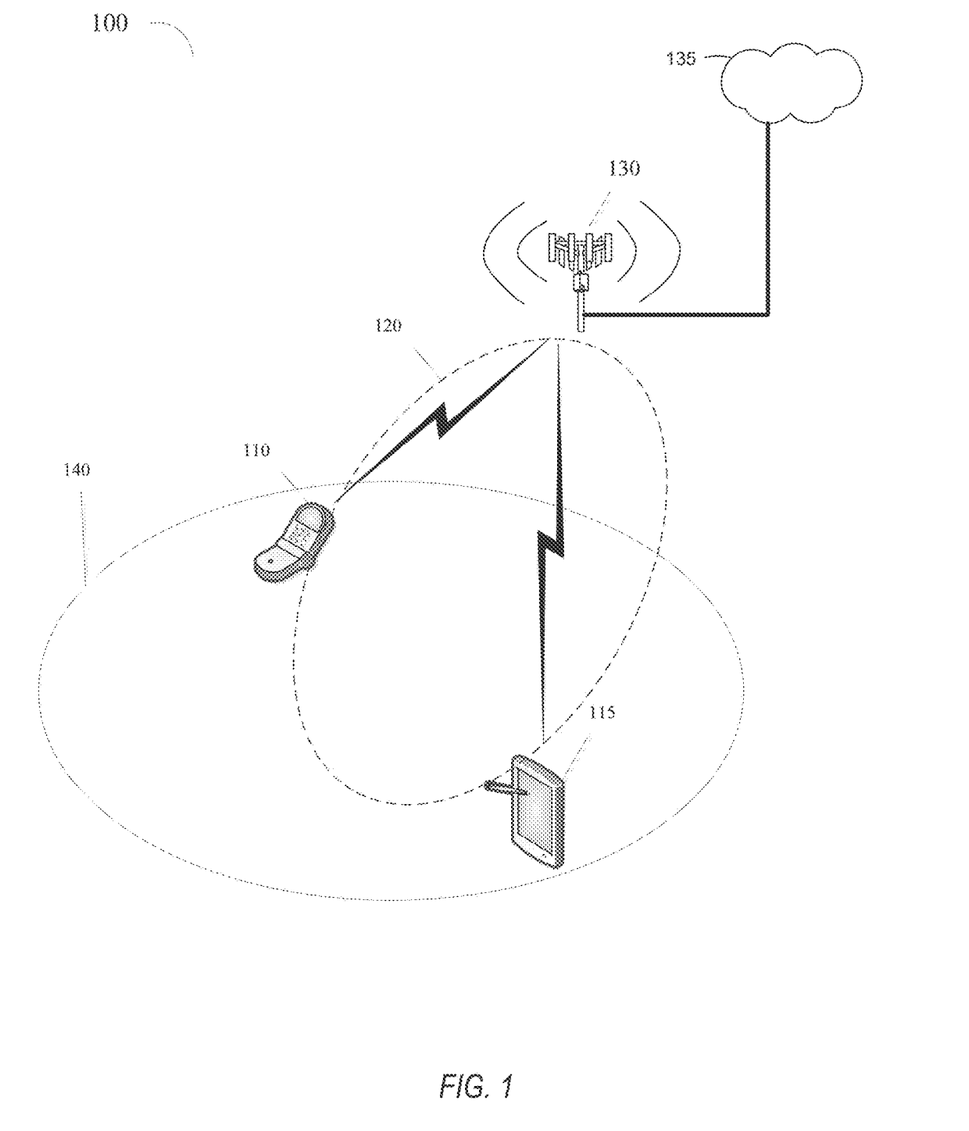
FIG. 1 illustrates a block diagram of a network which may be used in in accordance with example embodiments.

FIG. 1 illustrates a wireless network 100 in accordance with some embodiments. The wireless network 100 includes user equipment (UE) 110 and 115. The UEs 110 and 115 may be, for example, laptop computers, smart phones, tablet computers, printers, machine-type devices such as smart meters, or any other wireless device with or without a user interface. In an example, the UEs 110 and 115 have a wireless connection via air interface 120 in service area 140 to universal mobile telecommunications system terrestrial radio access node B (eNB) 130, which provides the UEs 110 and 115 with access to the network 135. The network 135 may represent an interconnection of a number of networks. For instance, the network 135 may couple with a wide area network such as the Internet or an intranet.

In some embodiments using wireless network 100, an eNB 130 is associated with several UE, and the eNB 130 determines that the use of NOMA communications to at least some of the UE will increase system performance. This occurs when two UE using the eNB 130 have a sufficiently large difference in their signal-to-interference-plus-noise ratio (SINR). The eNB selects at least two UE for NOMA communications, with a first UE to receive a higher power NOMA subframe and a second UE to receive a lower power subframe.

The eNB 130 then generates a power ratio for each device, and integrates this power ratio into a downlink control indicator (DCI) for each UE selected for NOMA communication. The DCI structure for NOMA signaling may include at least two bits, with each state described by the two bits associated with a power ratio range, and therefore indicating whether a given UE is to receive OMA data, higher power NOMA data, or lower power NOMA data. The eNB 130 then generates a wireless NOMA signal that includes the higher power NOMA data and the lower power NOMA data transmitted on top of each other as part of the same wireless signal. This signal is generated by power scaling the data for each UE, and then summing the power scaled data. The wireless NOMA signal is structures as a subframe that includes the DCI for each UE in a control region, and the scaled and summed NOMA transport data.

The first UE and the second UE both receive the same wireless NOMA signal. Based on the first DCI directed to the first UE, the first UE processes the wireless NOMA signal to retrieve the higher power NOMA data. Based on the second DCI directed to the second UE, the second UE processes the wireless NOMA signal to retrieve the lower power NOMA data.

The higher power NOMA data may be processed with minimal extra filtering, as the lower power NOMA data that is part of the wireless NOMA signal may be treated as noise on the higher power NOMA data. For the lower power NOMA data, processing is needed to identify the symbols of the lower power data because the lower power symbols will be obscured by the higher power symbols. In certain embodiments, successive interference cancellation (SIC) may be used to identify the symbols in the lower power data.

A subsequent DCI to each UE as part of following subframes may then inform each UE that a subsequent subframe is to be processed as a different type of communication. For example, the first UE may change positions with the second UE so that the second SINR values for the first UE and the second UE swap characteristics. Each UE may receive a DCI indicating the type of communication to be received, and each UE may then process the received communication with the signal type directed to the UE identified by the respective DCI. If the eNB determines that NOMA communications are no longer efficient, then a DCI may be sent to each UE indicating that OMA communications will be used.

The use of DCI to convey a NOMA signal indicator allows UE to receive higher power NOMA communications, lower power NOMA communications, or OMA communications in consecutive subframes, so that a single frame may switch back and forth between different communication types within a single frame. This use of dynamic NOMA communications may improve eNB throughput by up to 30% over static systems which only use one type of communication and where a system is not able to adapt to changing conditions that may create efficient environments for NOMA communications.

In certain embodiments, the DCI may only communicate a NOMA signal indicator that describes the type of data in a given subframe. Detailed power ratio information may be communicated as part of radio resource control signaling. A radio resource control signal including power ratio settings that provide detailed power ratio values may be sent to a UE. The UE may then use those detailed power ratio values for all NOMA communications received at the UE. If an update to the detailed power ratio values is needed, an update may be sent in subsequent radio resource control signals.

Figure 2:
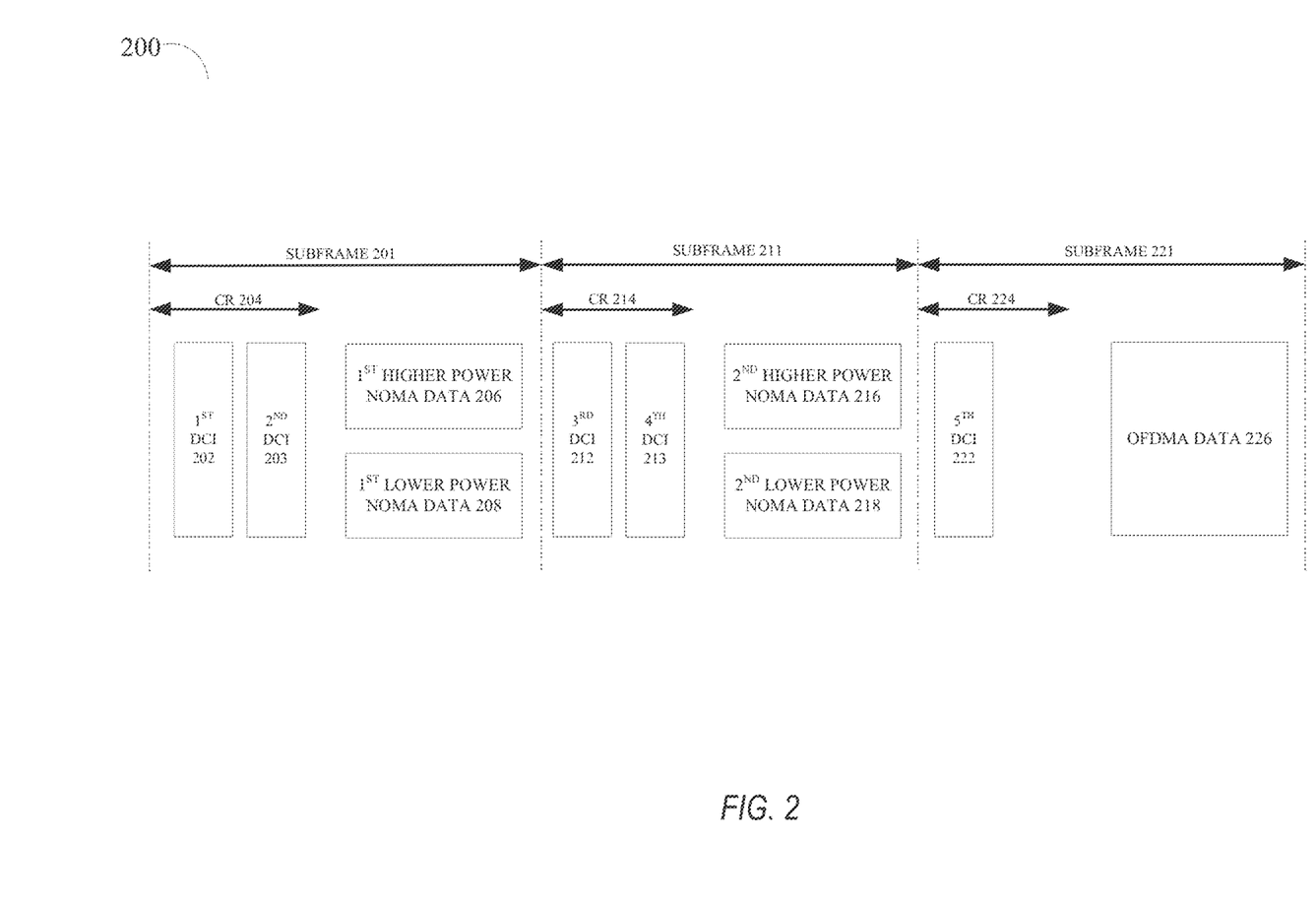
FIG. 2 illustrates aspects of data subframes which may be used with dynamic NOMA according to example embodiments.

FIG. 2 then illustrates a partial frame of data 200, with subframes 201, 211, and 221 shown which may be sent via air interface 120 from eNB 130 to both UE 110 and UE 115 as part of a NOMA communication. Subframe 201 includes first DCI 202 and second DCI in a control region 204. Each DCI carries detailed information for a particular UE, including the information about which demodulation scheme needs to be used by the UE to decode data, and where the data for a particular UE may be found within a subframe. In certain embodiments, a system may use different DCI formats within the system at the same time to provide information for different environments.

Embodiments described herein include at least one DCI format having a NOMA signal indicator element. The NOMA signal indicator element holds a value that may be used by a UE to determine whether the data for the UE is encoded with as higher power NOMA data, lower power NOMA data, or as OMA data. One example of a NOMA signal indicator element is a power ratio element. As described in more detail below, generation of NOMA signals according to certain embodiments comprises power scaling data for data meant for different devices, and then summing the power scaled data. The data for one UE is scaled to have a higher power, and the data for another UE is scaled to have a lower power. Because of this scaling, a power ratio for the lower power data as summed with the higher power data is always less than 0.5 and greater than 0. Similarly, the power ratio for the higher power data is always above 0.5 and less than 1. A power ratio of 1 means that there was no summing of multiple signals and a signal is therefore not a NOMA signal as described herein. Given these characteristics of power ratios for NOMA and OMA communications, a power ratio value provides information about the type of signal that is associated with the power ratio.

Each DCI 202, 203, 212, 213, and 222 is communicated during control regions 204, 214, and 224 of each subframe. Each DCI 202, 203, 213, 212, and 222 provides information about a transport block within a subframe that holds data. Subframes 201 and 211 include NOMA data that has been scaled and summed. In subframe 201, this NOMA data includes first higher power NOMA data 206 and first lower power NOMA data 208. Each part of the NOMA data will be associated with a DCI, and each DCI associated with UE data will be directed to a particular UE. Thus, first DCI 202 and first higher power NOMA data 206 may be directed to UE 110 from eNB 130, and $2^{nd}$ DCI 203 may be associated with $1^{st}$ lower power NOMA data 208 and directed to UE 115.

In subsequent subframes, the type of data directed to each UE may change. This may occur, for example, because of a change in the SINR for each device. Thus for subframe 211, the third DCI 212 may be associated with the second lower power NOMA data 218 and directed to UE 115, and the fourth DCI 213 may be associated with the second higher power NOMA data 216, and directed to UE 115. Similarly, within a single frame, the data directed to a particular UE may change from NOMA data to OMA data. Subframe 221 includes fifth DCI 222. Fifth DCI 222 is associated with orthogonal frequency division multiple access data 226, and may be directed to UE 110. Thus, in various embodiments, a single frame of data may include many combinations of data types, including NOMA data to a first and second UE as well as NOMA data to the second UE and a third UE in the same frame. Similarly, a single UE may receive NOMA data and OMA data from the same eNB as part of the same frame of data.

Figure 3:
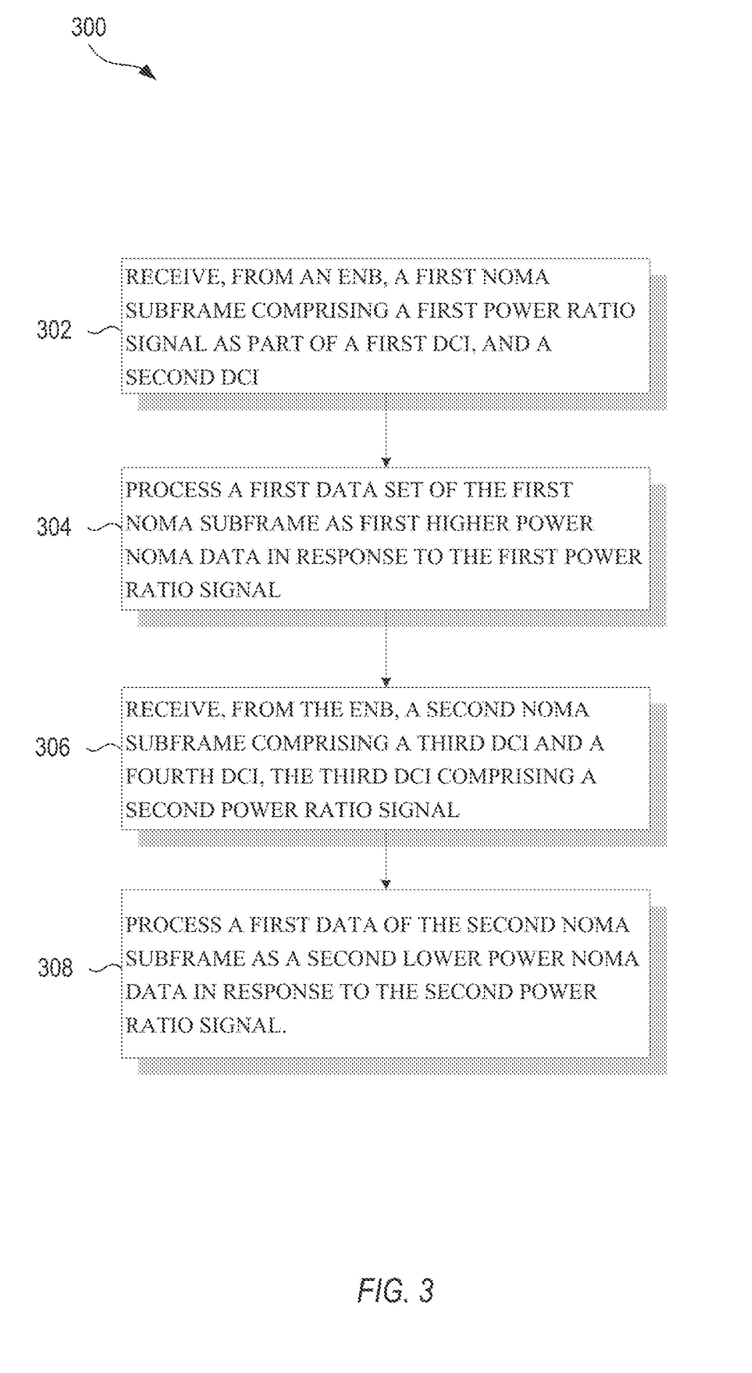
FIG. 3 shows a method for dynamic NOMA communications according to example embodiments.

FIG. 3 then describes a method 300 for dynamic NOMA communications. Method 300 is described with respect to system 100 and partial frame of data 200, but may be implemented with other systems and data structures in various different embodiments.

Operation 302 involves UE 110 receiving, from eNB 130, a first non-orthogonal multiple access (NOMA) subframe 201 comprising a first DCI 202 and a second DCI 203. The first DCI 202 is directed to UE 110 and the second DCI is directed to UE 115. Additionally, the first DCI 202 comprises a first power ratio signal.

Operation 304 then involves processing a first data set of the first NOMA subframe as first higher power NOMA data in response to the first power ratio signal. As described above, a power ratio signal may function as an indicator of the type of data in a subframe. When UE 110 receives subframe 201, it may initially process the data in control region 204 to determine that data in subframe 201 was sent from eNB 130 to UE 110. UE 110 may make this determination based on information from the first DCI 202. Once UE determines that data in subframe 201 is directed to UE 110, UE 110 may identify the first power ratio signal in the first DCI 202. When the first power ratio signal is used to determine that the data for UE 110 was sent as higher power NOMA data, UE 110 can then identify first higher power NOMA data 206 from subframe 201, and use the information in first DCI 202 to decode the first higher power NOMA data 206. A similar process will be carried out by UE 115 for first lower power NOMA data 208.

DCI signaling may then be used to process data of a different type from a subsequent subframe of the same frame of data. As part of this, operation 306 involves receiving at UE 110 from eNB 130, a second NOMA subframe 211. The second subframe 211 includes a third DCI 212 and a fourth DCI 213. Just as for the initial subframe 201, the DCI directed to UE 110 includes a power ratio signal, so that the third DCI 212 comprises a second power ratio signal.

Just as described above, the second power ratio signal may be used to identify the data in subframe 211 sent to UE 110 from eNB 130. In operation 308, however processing of the second power ratio signal is used to determine that the lower power data was sent to UE 110 in subframe 211, as compared with the higher power data that was sent to UE 110 in subframe 201. Operation 208 thus involves processing the second lower power NOMA data 218 for UE 110 in response to the second power ratio signal in third DCI 212. Just as with subframe 211, UE 115 will perform a similar process with the second higher power NOMA data 216.

Additional details related to certain implementations of dynamic NOMA communications are now described, again in the context of system 100, though various implementations may use other systems. One example of downlink NOMA systems can be illustrated assuming that one eNB 130 serves two UEs 110 and 115 using the same frequency/time resource. The eNB 130 is mounted with one or two transmit antennas and each UE is mounted with N_r receive antennas. The modulated symbols for transmission as data from eNB 130 to both UE 110 and UE 115 are summed up after power scaling and before transmission via an air interface 120. This may be described as:

$$y_i = H_i \left( \underbrace{\sqrt{p_1}\,[P_1, P_2]/\sqrt{2} \begin{bmatrix} x_{1,2} \\ x_{1,2} \end{bmatrix}}_{P} + \sqrt{p_2}\,P_1 x_2 \right) + n_i \quad (1)$$

where y_i is N_r×1 received signal vectors; H_i is N_r×N_t channel matrix of UE 110; p_i is the power scaling factor for UE 110; [P_1, P_2]/√2 is the precoder for UE 110 and it is reduced to P_1 if UE 110 has rank one transmission; P_1 is a precoder for UE 115; x_i is the data symbol(s) of the codeword(s) which is(are) intended for UE 110; x is the super-imposed data symbol of both UEs 110 and 115; n_i is N_r×1 noise vector; N_r is the number of receive antennas for each UE; N_t is number of transmit antennas for eNB 130.

The power allocation is subject to the constraint that $$p_1 + p_2 = 1 \quad (2)$$

Assuming $|(H_1P_1)^H(H_1P_1)|/r > |(H_2P_1)^H(H_2P_1)|$, then as a results $p_1 < p_2$, where r is the transmission rank of UE 110.

Each UE can first estimate the super-imposed data symbol using linear receiver, e.g. MRC receiver using equation (3):

$$\hat{x} = G_i y_i = \tilde{H}_i^H y_i / \|\tilde{H}_i\| \quad (3)$$

After that, both UE 110 and UE 115 can decode the codeword of UE 115 first. If the codeword of UE 115 is decoded successfully, UE 115 does not need to perform any further decoding since UE 115 then has the data from eNB 130 that was directed to UE 115. UE 110 can reconstruct the second data symbol $\hat{x}\_2 = \hat{H}\_i x\_2$ and subtract it from the super-imposed data symbol $\hat{x}$ to estimate data symbol x_1 which is intended for UE 115. The estimated data symbol of the codeword related to symbol x_1 can be written as:

$$\hat{x}_1 = (\hat{x} - \sigma\sqrt{p_2}\hat{x}_2)/\sqrt{p_1} \quad (4)$$

where σ is the interference cancellation factor and σ∈[0,1]. When σ equals to 1, the code word of UE 115 is canceled completely.

Given (1) above, users with large SINR differences may be paired together to maximize the gain associated with NOMA communications. A power control system may be used to set a high transmit power for a UE with low channel gain, and a low transmit power for a UE with high channel gain. One way to determine the power level for UE 110 is to solve:

$$\frac{1}{2}\log_2(1+\gamma_2) = \log_2\left(1 + \frac{(1-p_1^*)\gamma_2}{(p_1^*/r)\gamma_2 + 1}\right) \quad (5)$$

where γ_2 is the SNR of UE2.

When (5) is satisfied, the channel capacity of UE 115 equals that of OMA transmission in which UE 115 is allocated half of the system bandwidth and served with full transmit power. A channel capacity gain for NOMA operation verses OMA operation is dependent on the channel capacity of UE 110, which can be expressed as:

$$C_{NOMA} - C_{OMA} = \log_2(1 + p_1^* \gamma_1) - \tfrac{1}{2}\log_2(1+\gamma_1) \quad (6)$$

where γ_1 is the SNR of UE 110.

A power allocation strategy for a system may be given by $$p_1^* = \frac{\sqrt{1+\gamma_2} - 1}{\gamma_2}, \quad \text{where } \gamma_2 > 0, \quad (7)$$

A channel capacity gain for NOMA communications over OMA communications is then achieved if the power allocation ration of UE 110 satisfies:

$$p_1^* > \frac{\sqrt{1+\gamma_1} - 1}{\gamma_1} \text{ where } \gamma_1 > 0, \quad (8)$$
$$\text{when } \gamma_1 > \gamma_2, p_1^* s$$

An eNB may then use this assessment of the channel capacity gain from NOMA communications against OMA communications to determine when to dynamically use NOMA communications, and also to determine which UE to assign as recipients of higher power NOMA data and which UE to assign as recipients of lower power data.

In certain embodiments, dynamically switching between OMA and NOMA avoids a degradation of overall system capacity when the system environment is not optimal for one or the other types of communications. In certain implementations, dynamic switching between OMA and NOMA may be decided by an eNB or system controller based on proportional fairness metrics. When the benefits of NOMA communication are analyzed as described above for multiple UEs in communication with an eNB, the sum of a set of proportion fairness metrics in a pair of UE is used as the proportional fairness metric for the NOMA pairing. If the proportional fairness metric of the best NOMA pair available to an eNB is higher than the proportional fairness metric of the best single user transmission. NOMA transmission is applied. Otherwise, OMA communications to single UE are used.

Given various implementations of the above described decision making process for using NOMA communications, a single UE may be selected to receive both higher power NOMA data and lower power NOMA data a significant percentage of the time, depending on the number of users for an eNB and the particular power allocation methods used. Such percentages may be as high as 80 percent in certain implementations and operational environments.

The signaling for dynamic NOMA communications may then be done using DCI either alone, or in conjunction with additional signaling. In a first example embodiment, a certain number of bits are assigned in a DCI format as NOMA signaling elements. This may, in certain embodiments, involve 4-8 bits of a certain DCI format. When the value for the NOMA signaling is a power ratio value between 0 and 0.5, a UE is signaled to receive lower power NOMA data, and when the value for the NOMA signaling is a power ratio value between 0.5 and 1, the UE is signaled to receive higher power NOMA data. When a NOMA signaling value is equal to one, the UE is signaled to receive normal OMA communications.

In an alternative embodiment, only 2-3 bits of a DCI format may be assigned as a NOMA signaling element. These bits are assigned to signal at least four power states, and may either be added to existing DCI formats, or may reuse existing bit patters which are redundant in an existing DCI format. Each power ratio state is mapped to one power ratio value. One power ratio state for the 2-3 bits is mapped to OMA transmission. One power ratio state is mapped to lower power NOMA data, and one power ratio state is mapped to higher power NOMA data. For the states mapped to NOMA data, the 2 or 3 bit implementations do not provide enough states to accurately represent the power ratio of the system. In such embodiments, an additional signal to provide detailed power ratio values may be signaled with radio resource control (RRC) signaling. Such embodiments may enable dynamic use of NOMA communications on a subframe basis, but the power ratio may only be changed by RRC signaling, and so system opportunities to change power ratios during operation will occur less frequently than the opportunities to dynamically change from NOMA to OMA or between types of NOMA communications to a single UE. In one example embodiment, DCI signaling may enable data received by a UE to change every subframe, while the power ratio value associated with NOMA communications to the UE may only change every frame, or after multiple frames defined by RRC signaling frequency.

Figure 4:
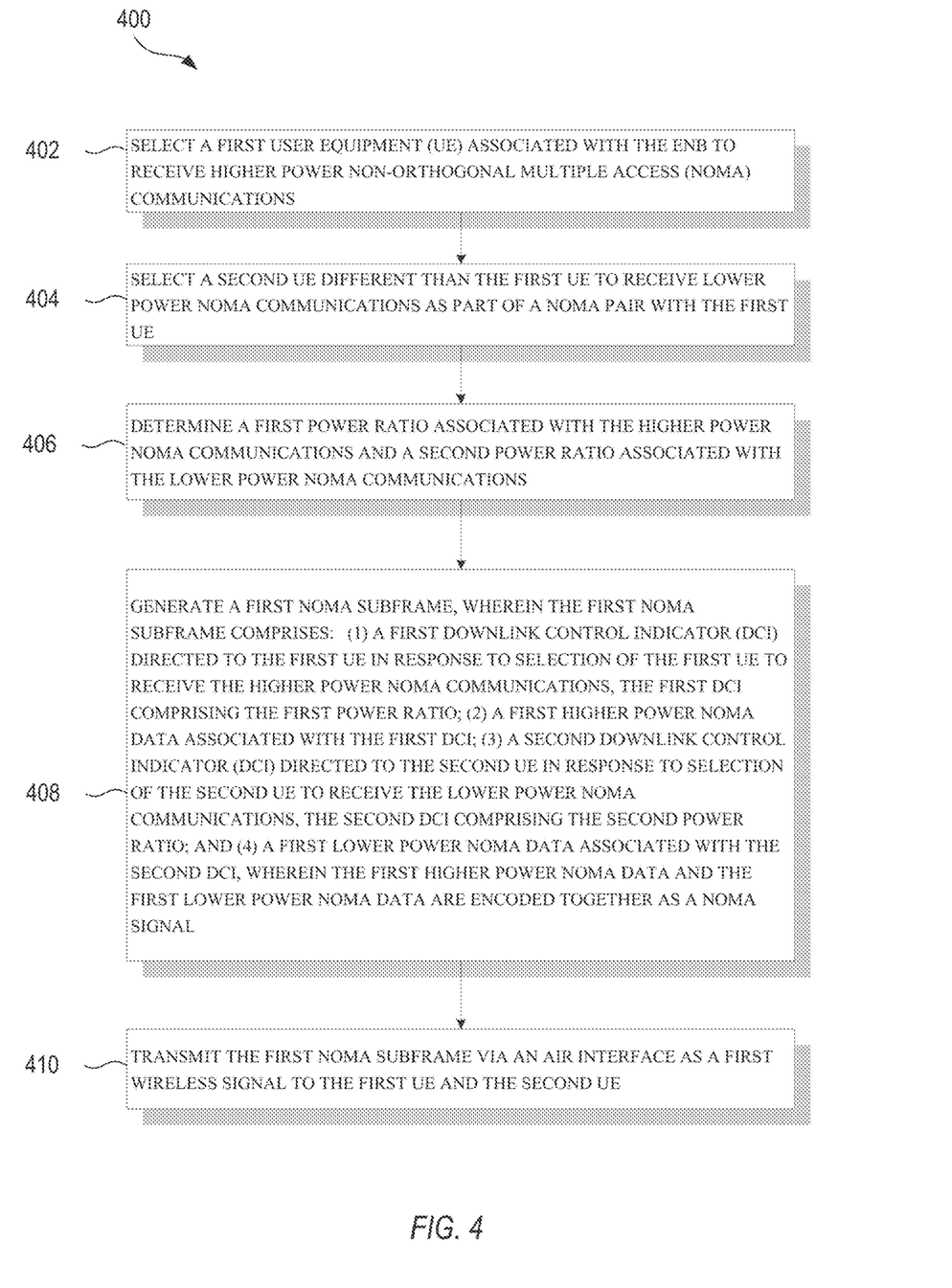
FIG. 4 shows a method for dynamic NOMA communications according to example embodiments.

FIG. 4 then describes another method for dynamic NOMA communications according to certain example embodiments, shown as method 400. Just as above for method 300, method 400 may be performed by a variety of different systems, but is described with respect to system 100 for the sake of illustration.

Operation 402 of method 400 involves selecting a first UE 110 associated with the eNB 130 to receive higher power non-orthogonal multiple access (NOMA) communications. Operation 404 involves selecting a second UE 115 different than the first UE 110 to receive lower power NOMA communications as part of a NOMA pair with the first UE 110. As described above, a NOMA pair may be selected by comparing the throughput of OMA communications with the throughput of NOMA communications. When eNB 130 is communicating with a large number of UE in addition to UE 110 and UE 115, eNB 130 may sort UE by SINR or other UE characteristics, and may test NOMA pairs in order based on the UE characteristics. In other embodiments, an eNB may test all possible combinations of NOMA pairs for UE currently in communication with eNB 130, and may then calculate or estimate an optimal distribution of NOMA pair and OMA single UE communications. In alternate embodiments, a combination of estimates from a limited set of NOMA pairs combined with estimated optimization selections may be used to determine whether NOMA or OMA communications are used for each UE communicating with eNB 130.

Operation 406 then involves determining a first power ratio associated with the higher power NOMA communications and a second power ratio associated with the lower power NOMA communications. This information is then used in operation 406 to generate a first NOMA subframe. Various example embodiments of a NOMA subframe are described above. The NOMA subframe may be generated in operation 408 by creating a first DCI for the first UE 110, a second DCI for the second UE 115, and generating the transmission data by scaling the data for each UE with the appropriate power ratio, and then summing the scaled data.

After the NOMA subframe is generated, operation 410 involves transmitting the first NOMA subframe via an air interface 120 as a first wireless signal to the first UE 110 and the second UE 115.

In addition to the various embodiments described above, additional alternative embodiments are also possible, and no single implementation described herein defines a scope for all embodiments.

One additional example comprises a UE configured to receive, from an evolved universal mobile telecommunications system terrestrial radio access node B (eNB), a first non-orthogonal multiple access (NOMA) subframe comprising a first downlink control indicator (DCI) and a third DCI, wherein the first DCI is directed to the UE, the third DCI is directed to a second UE, and the first DCI comprises a first power ratio signal. The UE is also configured to process a first data set of the first NOMA subframe as first higher power NOMA data in response to the first power ratio signal and receive, from the eNB, a second NOMA subframe comprising a second DCI and a fourth DCI, the second DCI comprising a second power ratio signal. The UE is also configured to process a first data set of the second NOMA subframe as second lower power NOMA data in response to the second power ratio signal.

Additional implementations of such a UE may further be configured where the first NOMA subframe is received by the UE as a first NOMA signal comprising the first higher power NOMA data and first lower power NOMA data; the first DCI identifies that the first higher power NOMA data is directed to the UE; the first lower power NOMA data comprises a signal directed to the second UE; and the third DCI is associated with the first lower power NOMA data.

Additional implementations of such a UE may further be configured where the second NOMA subframe is received by the UE as a second NOMA signal comprising the second lower power NOMA data and second higher power NOMA data; wherein the second DCI identifies that the second lower power NOMA data is directed to the UE; wherein the second higher power NOMA data comprises a second signal directed to the second UE; and wherein the fourth DCI is associated with the second higher power NOMA data.

Additional implementations of such a UE may further be configured where the first higher power NOMA data and the first lower power NOMA data use shared frequency and time resource elements; and wherein the second higher power NOMA data and the second lower power NOMA data use shared frequency and time resource elements.

Additional implementations of such a UE may further be configured where processing the second lower power NOMA data comprises performing an interference cancellation process to cancel interference from the second higher power NOMA data.

Additional implementations of such a UE may further be configured where the interference cancellation process comprises successive interference cancellation (SIC).

Additional implementations of such a UE may further be configured where a first power ratio associated with the first power ratio signal is a ratio between 0.5 and 1

Additional implementations of such a UE may further be configured where a second power ratio associated with the second power ratio signal is between 0 and 0.5.

Additional implementations of such a UE may further be configured where the second NOMA subframe directly follows the first NOMA subframe as part of a first frame of data.

Additional implementations of such a UE may further be configured to receive, by the UE from the (eNB), a third subframe, the third subframe comprising a fifth DCI, and the fifth DCI comprising a fifth power ratio signal; and process, by the UE, a third data set of the third subframe as an orthogonal multiple access subframe in response to the fifth power ratio signal; wherein the third subframe is part of the first frame of data.

Additional implementations of such a UE may further be configured where the fifth power ratio is equal to 1.

Additional implementations of such a UE may further be configured to receive, from the eNB prior to receiving the first DCI communication, a radio resource control (RRC) communication, wherein the RRC communication indicates an initial UE state as a NOMA state or an orthogonal multiple access state.

Additional implementations of such a UE may further be configured where the UE comprises an antenna configured to receive the first NOMA subframe; and an integrated circuit coupled to the antenna and configured to receive the first NOMA subframe from the antenna and to process the first data as the first higher power NOMA data in response to the first DCI. In alternate embodiments, any UE may be implemented using details of UE 500 described below, or any other such implementation of a UE described herein or using combinations of elements described herein.

Another example embodiment of dynamic NOMA communications is a method for wireless communications comprising receiving, at a first user equipment (UE) from an evolved universal mobile telecommunications system terrestrial radio access node B (eNB), a first subframe, the first subframe comprising a first downlink control indicator (DCI) directed to the first UE, a third DCI directed to a second UE, first data associated with the first DCI, and third data associated with the second DCI, wherein the first DCI comprises a first non-orthogonal multiple access (NOMA) signal indicator; processing the first data as first higher power NOMA data in response to the first NOMA signal indicator; receiving, at the UE from the eNB, a second subframe, the second subframe comprising a second DCI associated with the first UE, a fourth DCI associated with the second UE, second data associated with the second DCI, and fourth data associated with the fourth DCI, wherein the second DCI comprises a second NOMA signal indicator; and processing, by the UE, the second data as a second lower power NOMA subframe in response to the second NOMA signal indicator; wherein the first subframe and the second subframe are received by the UE as part of a first frame of data.

Such a method may further operate, in certain embodiments, where the NOMA signal indicator comprises eight bits of the first DCI, with each value state of the NOMA signal indicator representing a power ratio, with each power ratio comprising a value between 0 and 1, excluding the values of 0 and 0.5 and including the value 1.

Another example embodiment is a non-transitory computer readable medium comprising computer readable instructions that, when executed by a processor, cause a user equipment (UE) to receive radio resource control (RRC) signaling; receive a first subframe comprising a first downlink control indicator (DCI) and a third DCI, wherein the first DCI is directed to the UE, the third DCI is directed to a second UE, and the first DCI comprises a first power ratio signal; process first data of the first subframe as first higher power non-orthogonal multiple access (NOMA) data in response to the first power ratio signal; receive, from the eNB, a second subframe comprising a second DCI and a fourth DCI, a the second DCI comprising a second power ratio signal; process first data of the second subframe as second lower power NOMA data in response to the second power ratio signal.

Further examples of such a medium may include implementations where the first power ratio signal comprises two bits of the DCI; wherein a first power ratio state of a DCI format associated with the DCI is mapped to an orthogonal frequency division multiple access (OFDMA) transmission; wherein a second power ratio state of the DCI format is mapped to a power ratio value between 0 and 0.5 with a first detailed power ratio value determined by the RRC signaling; and wherein a third power ratio state of the DCI format is mapped to a power ratio value between 0.5 and 1 with a second detailed power ratio value determined by the RRC signaling.

In various implementations of an eNB described herein, a first UE is selected to receive the higher power NOMA communication based on a first distance from the eNB to the first UE and a second distance from the eNB to the second UE.

In other implementations an eNB described herein may be configured to select, following transmission of the first wireless signal, the first UE to receive first orthogonal frequency division multiple access (OFDMA) data; select, following transmission of the first wireless signal, the second UE to receive second higher power non-orthogonal multiple access (NOMA) data; select a third UE different than the first UE and the second UE to receive second lower power NOMA data; communicate a third subframe comprising a third DCI and first OFDMA data to the first UE in response to selection of the first UE to receive the first OFDMA subframe; communicate a fourth subframe to the second UE and the third UE. Such a fourth subframe may comprise a fourth DCI comprising a third power ratio; a fifth DCI comprising a fourth power ratio; second higher power data associated with the fourth DCI; and second lower power data associated with the fifth DCI.

Figure 5:
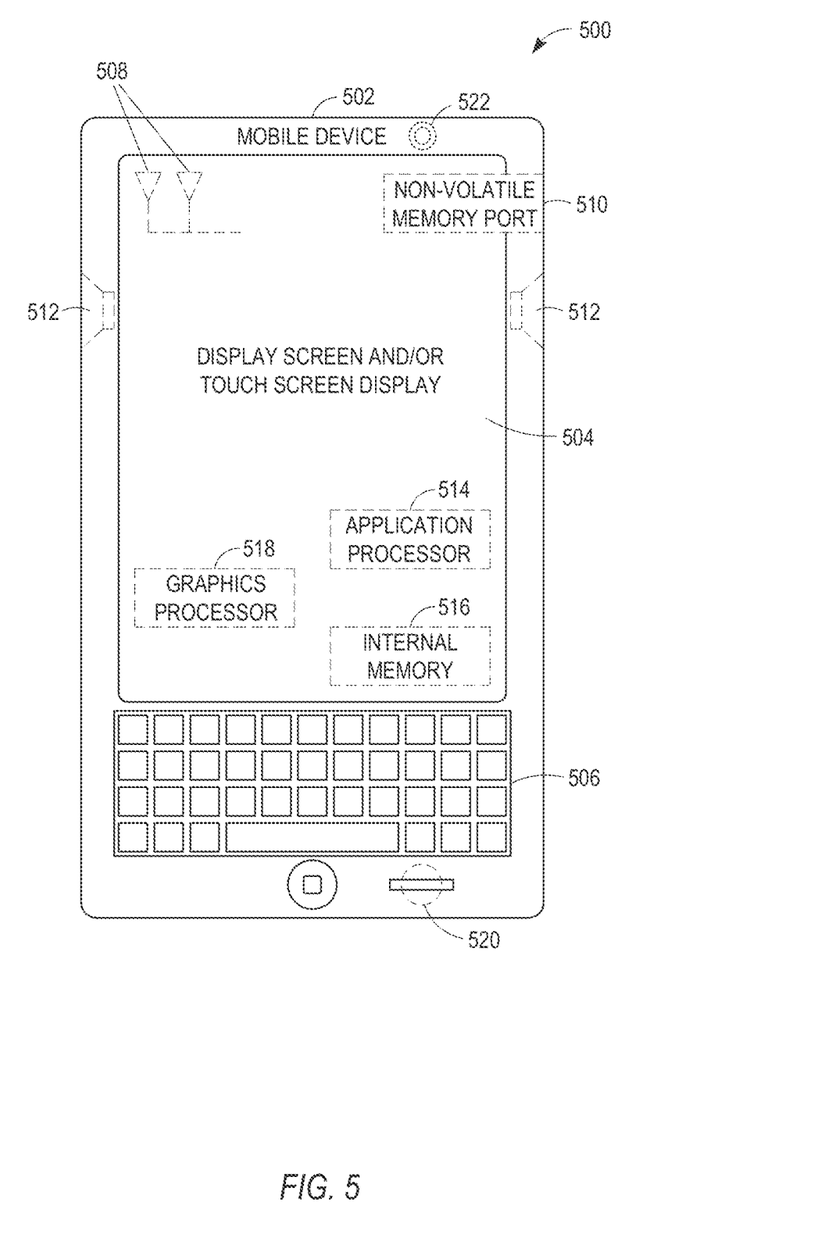
FIG. 5 illustrates an example UE which may be used with an asymmetric RAN, in accordance with some embodiments.

FIG. 5 illustrates an example of a UE 500. The UE 500 can be used as an implementation of any UE described herein, including UE 110 and UE 115. UE 500 can also be any mobile device, a mobile station (MS), a mobile wireless device, a mobile communication device, a tablet, a handset, or other type of mobile wireless computing device. The UE 500 can include one or more antennas 508 within housing 502 that are configured to communicate with a hotspot, base station (BS), an eNB, or other type of WLAN or WWAN access point. UE may thus communicate with a WAN such as the Internet via an eNB or base station transceiver implemented as part of an asymmetric RAN as detailed above. UE 500 can be configured to communicate using multiple wireless communication standards, including standards selected from 3GPP LTE, WiMAX, High Speed Packet Access (HSPA), Bluetooth, and Wi-Fi standard definitions. The UE 500 can communicate using separate antennas for each wireless communication standard or shared antennas for multiple wireless communication standards. The UE 500 can communicate in a WLAN, a WPAN, and/or a WWAN.

FIG. 5 also shows a microphone 520 and one or more speakers 512 that can be used for audio input and output from the UE 500. A display screen 504 can be a liquid crystal display (LCD) screen, or other type of display screen such as an organic light emitting diode (OLED) display. The display screen 504 can be configured as a touch screen. The touch screen can use capacitive, resistive, or another type of touch screen technology. An application processor 514 and a graphics processor 518 can be coupled to internal memory 516 to provide processing and display capabilities. A non-volatile memory port 510 can also be used to provide data input/output options to a user. The non-volatile memory port 510 can also be used to expand the memory capabilities of the UE 500. A keyboard 506 can be integrated with the UE 500 or wirelessly connected to the UE 500 to provide additional user input. A virtual keyboard can also be provided using the touch screen. A camera 522 located on the front (display screen) side or the rear side of the UE 500 can also be integrated into the housing 502 of the UE 500. Any such elements may be used to generate information that may be communicated as uplink data via an asymmetric C-RAN and to receive information that may be communicated as downlink data via an asymmetric C-RAN as described herein.

Figure 6:
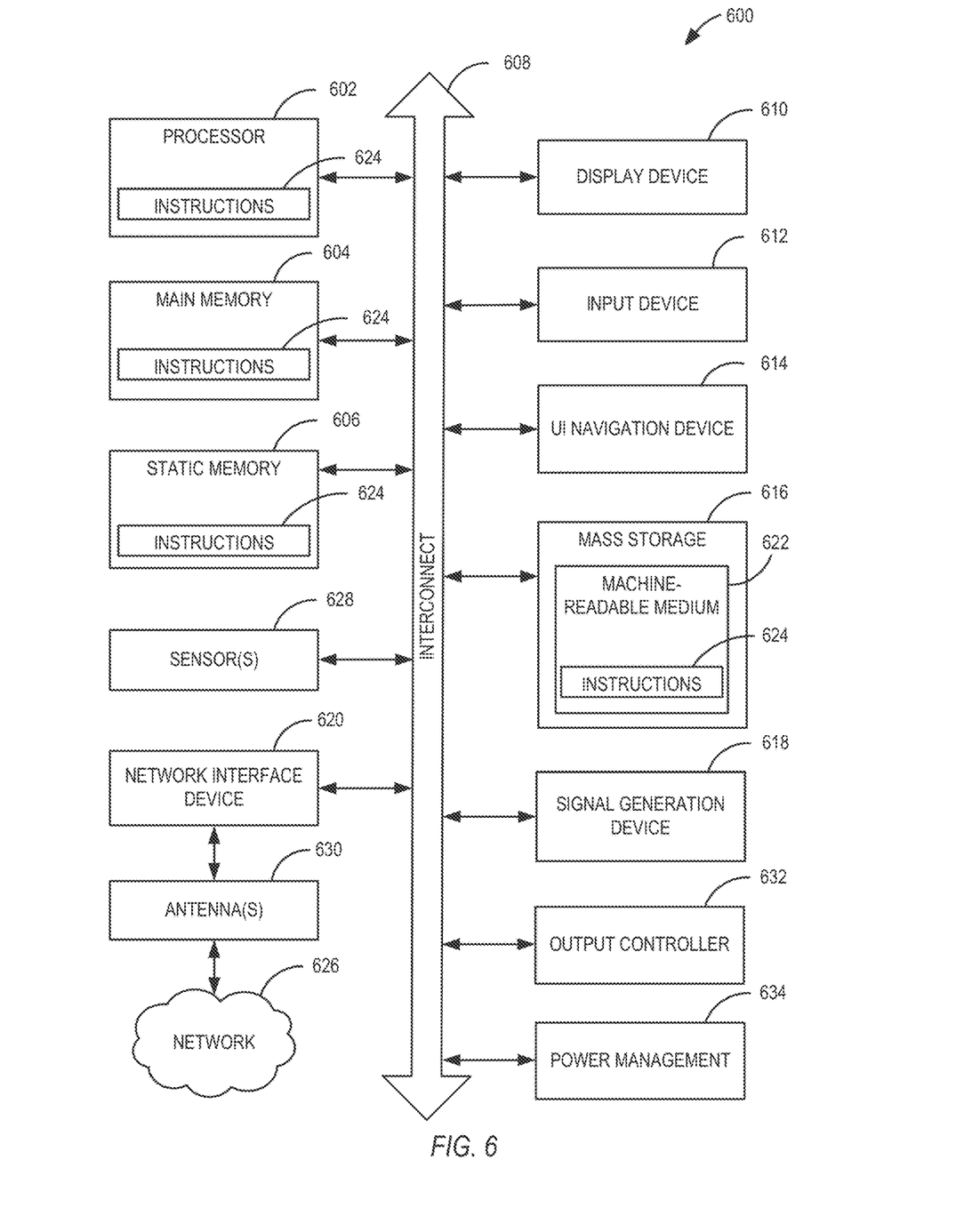
FIG. 6 is a block diagram illustrating an example computer system machine upon which any one or more of the methodologies herein discussed can be run, in accordance with some embodiments.

FIG. 6 is a block diagram illustrating an example computer system machine 600 upon which any one or more of the methodologies herein discussed can be run. Computer system machine 600 or elements of computer system machine 600 can be embodied as the a UE 500, eNB 130, UE 110, UE 115, or any other computing platform or element described or referred to herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 600 includes a processor 602 (e.g., a central processing unit (CPU), a graphics processing unit (GPU) or both), a main memory 604 and a static memory 606, which communicate with each other via an interconnect 608 (e.g., a link, a bus, etc.). The computer system machine 600 can further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are a touch screen display. The computer system machine 600 can additionally include a storage device 616 (e.g., a drive unit), a signal generation device 618 (e.g., a speaker), an output controller 632, a power management controller 634, and a network interface device 620 (which can include or operably communicate with one or more antennas 630, transceivers, or other wireless communications hardware), and one or more sensors 628, such as a Global Positioning Sensor (GPS) sensor, compass, location sensor, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 can also reside, completely or at least partially, within the main memory 604, static memory 606, and/or within the processor 602 during execution thereof by the computer system machine 600, with the main memory 604, static memory 606, and the processor 602 also constituting machine-readable media.

While the machine-readable medium 622 is illustrated in an example embodiment to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 624 can further be transmitted or received over a communications network 626 using a transmission medium via the network interface device 620 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

What is claimed is:

1. An apparatus of an enhanced Node B (eNB), the apparatus comprising:
processing circuitry; and
memory,
the processing circuitry configured to:
encode radio-resource control (RRC) signaling to configure a first user equipment (UE) with a power allocation for a multiple-user superimposed transmission, the multi-user superimposed transmission comprising superimposed data symbols for more than one UE;
encode downlink control information (DCI) for transmission to the first UE, the DCI encoded in accordance with a DCI format to include a field to signal interference presence for the multiple-user superimposed transmission;
encode first data symbols for the first UE in accordance with modulation information signaled in the field;
combine the encoded first data symbols for the first UE with encoded second data symbols for a second UE for the multiuser superimposed transmission,
wherein the first data symbols and the second data symbols are mapped to different layers for an orthogonal frequency division multiple access (OFDMA) transmission on non-orthogonal resources, and
wherein the memory is configured to store the field of the DCI.

2. The apparatus of claim 1 wherein the first UE is a near UE, and wherein the first data symbols for the first UE are encoded at a higher rate than the second data symbols for the second UE.

3. The apparatus of claim 1 wherein for the multiuser superimposed transmission, a power level for transmission of the first data symbols is reduced by a value indicated by the RRC signaling.

4. The apparatus of claim 3, wherein the first UE is a near UE.

5. The apparatus of claim 1, wherein the processing circuitry is further configured to:
   encode a second DCI for transmission to the second UE, the second DCI encoded in accordance with the DCI format to include the field to signal interference presence for the multiple-user superimposed transmission to the second UE.

6. The apparatus of claim 1, wherein the first and second data symbols are mapped to non-orthogonal resources for transmission to the first and second UEs in a first subframe, wherein for a second subframe,
   the processing circuitry is configured to encode a second DCI for transmission to the first UE without a field to signal interference presence for a multiple-user superimposed transmission.

7. The apparatus of claim 1 wherein the multiuser superimposed transmission comprises a transmission of the first data symbols to the first UE and the second data symbols to the second UE on non-orthogonal channel resources.

8. The apparatus of claim 1 further comprising transceiver circuitry configured for transmission of the combined encoded data symbols of the multiple-user superimposed transmission.

9. The apparatus of claim 8 further comprising two or more antennas.

10. A non-transitory computer-readable storage medium that stores instructions for execution by processing circuitry of an enhanced node B (eNB) to:
    encode radio-resource control (RRC) signaling to configure a first user equipment (UE) with a power allocation for a multiple-user superimposed transmission, the multi-user superimposed transmission comprising superimposed data symbols for more than one UE;
    encode downlink control information (DCI) for transmission to the first UE, the DCI encoded in accordance with a DCI format to include a field to signal interference presence for the multi-pleuser superimposed transmission;
    encode first data symbols for the first UE in accordance with modulation information signaled in the field;
    combine the encoded first data symbols for the first UE with encoded second data symbols for a second UE for the multiuser superimposed transmission,
    wherein the first data symbols and the second data symbols are mapped to different layers for an orthogonal frequency division multiple access (OFDMA) transmission on non-orthogonal resources; and
    wherein memory is configured to store the field of the DCI.

11. The non-transitory computer-readable storage medium of claim 10, wherein the processing circuitry is further configured to:
    encode a second DCI for transmission to the second UE, the second DCI encoded in accordance with the DCI format to include the field to signal interference presence for the multiple-user superimposed transmission to the second UE.

12. The non-transitory computer-readable storage medium of claim 10, wherein the first and second data symbols are mapped to non-orthogonal resources for transmission to the first and second UEs in a first subframe,
    wherein for a second subframe, the processing circuitry is configured to encode a second DCI for transmission to the first UE without a field to signal interference presence for a multiple-user superimposed transmission.

13. The non-transitory computer-readable storage medium of claim 10 wherein for the multiuser superimposed transmission, a power level for transmission of the first data symbols is reduced by a value indicated by the RRC signaling.

14. The non-transitory computer-readable storage medium of claim 13, wherein the first UE is a near UE.

15. An apparatus of a user equipment (UE), the apparatus comprising:
    memory; and processing circuitry, configured to:
    decode radio-resource control (RRC) signaling to configure the UE with a power allocation for a multiple-user superimposed transmission, the multi-user superimposed transmission comprising superimposed data symbols for more than one UE;
    decode downlink control information (DCI) for the first UE, the DCI encoded in accordance with a DCI format to include a field to signal interference presence for the multipleuser superimposed transmission; and
    decode the multiuser superimposed transmission comprising combined data symbols that include first data symbols for the first UE and second data symbols for a second UE, wherein the first data symbols are decoded based on modulation information signaled in the field, and
    wherein the memory is configured to store the field of the DCI,
    wherein the first and second data symbols are mapped to non-orthogonal resources for transmission to the first and second UEs in a first subframe,
    wherein for a second subframe, the processing circuitry is configured to decode a second DCI for the first UE without a field to signal interference presence for a multiple-user superimposed transmission.

16. The apparatus of claim 15 wherein for the multiuser superimposed transmission, a power level for transmission of the first data symbols is reduced by a value indicated by the RRC signaling.

17. The apparatus of claim 15 wherein the multiuser superimposed transmission comprises a transmission of the first data symbols to the first UE and the second data symbols to the second UE on non-orthogonal channel resources.

* * * * *